United States Patent Office.

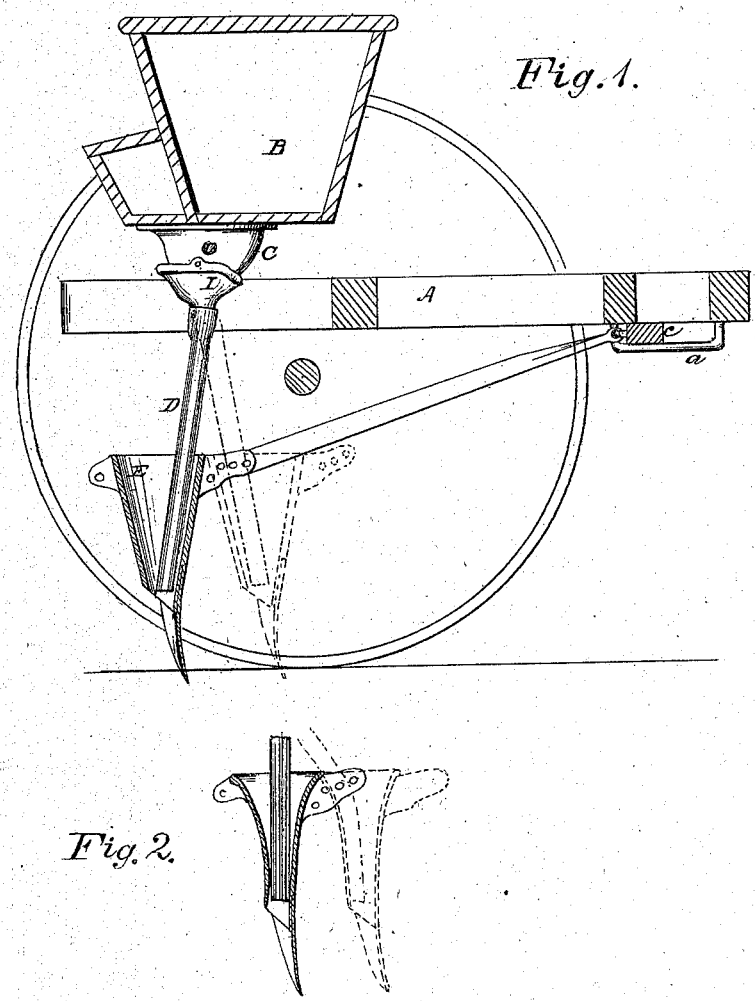

JOHN H. THOMAS, OF SPRINGFIELD, OHIO.

Letters Patent No. 105,866, dated July 26, 1870.

IMPROVEMENT IN GRAIN-DRILLS.

The Schedule referred to in these Letters Patent and making part of the same.

Be it known that I, JOHN H. THOMAS, of Springfield, in the county of Clark and State of Ohio, have invented certain new and useful Improvements in Grain-Drills, of which the following is a clear, full, and exact description, the accompanying drawing forming a part thereof.

My invention relates to grain-drills; and

It consists in constructing the hoes or drill-tubes of such a form that they may be arranged in two rows, one behind the other, and have the tube that conducts the grain from the hopper to the hoe work freely therein without binding and chafing, as hereinafter more fully explained.

Figure 1 represents a longitudinal vertical section of a grain-drill with my improved hoe applied thereto.

Figure 2 represents the old style of hoe.

In this case, A represents the frame; B, the hopper; C, the seed-cup, in which the feed-roller operates; I, a supplementary cup, pivoted to the cup C; and D, the grain-conductor or tube; these parts all being made in a manner described in patents heretofore granted to Thomas & Mast, and which, being well understood by the public generally, need not be further described.

In this, the sliding bar c, to which one row or portion of the drag-bars is attached, is supported at each end upon a rod, a, attached to the side bars of the frame, as shown in fig. 1, the other half of the drag-bars being attached to the frame in the usual manner.

The conductors or grain-tubes D are usually made of rubber, and are, therefore, somewhat expensive; hence it is an object to so so construct the machine as to cause the least possible amount of wear upon these tubes.

As drills were formerly constructed, the hoes were all arranged in a single row; but recently they are so made as to use two rows of hoes, one in rear of the other.

When two rows of hoes are used, it has been customary to arrange the grain-tubes or conductors in two corresponding rows, there being either two rows of holes in the hopper bottom for the escape of the grain, or, if but one row of holes were made in the hopper bottom, then there had necessarily to be used an additional set of spouts to convey the grain from the hopper to the two rows of tubes or conductors.

When a single row of hoes was used, it was only necessary to have the opening through the hoe of sufficient size to permit the tube to pass straight through it, and permit the hoe to play up and down thereon, as it necessarily must in passing over the undulations of the surface of the ground, the hoe being hinged to the frame by the drag-bar, while the tube is fixed to the hopper bottom, either directly or by means of the seed-cups; but when two rows of hoes are used, if made as formerly, and as represented in fig. 2, there not being sufficient space within the hoe for the tube D to incline forward or backward and play freely and loosely, it follows that, with such hoes, the tubes are bent as represented by the dotted lines in fig. 2, and that, when thus bent, there will be great wear on the tubes D, they being so chafed, worn, or injured, as soon to destroy them. In addition to this, if the hoes are raised by striking stones, clods, or other obstacles, when the tubes D are thus bent, the tubes will be collapsed or compressed, so as to prevent the flow or passage of the grain through them; and, when this occurs, it is obvious that no grain will be planted. This difficulty with the tubes exists especially where the hoes are made adjustable back and forth, as has been more recently done.

To obviate these difficulties, I make the hoe or drill-tube E of the form or style represented in fig. 1. By examining the figure, it will be observed that the hoe is made wider from front to rear at its upper end, and that, instead of curving inward from the top downward, as in fig. 2, it descends both on its front and rear faces, in a straight or nearly straight line, from top to bottom, it being much narrower at the bottom than at the top.

By constructing the hoe in this form it can be moved either forward or back, as shown in fig. 1, and the grain-tube D still have room to play freely therein, thus preventing the chafing, bending, or collapsing of the tube. By this simple plan I entirely overcome the difficulties mentioned, and render the machine more perfect in its operation and more durable.

I am aware that drill-hoes have been made of an oval or elliptical form, and flaring at the top, and, therefore, I do not claim such; but having fully described my invention,

What I claim is—

1. The drill-hoes E, having their interior opening made substantially as described, whereby the grain-tubes or conductors D, when attached in a single row to the hopper-bottom, or to seed-cups arranged in a single row, are enabled or permitted to hang and play loosely within the hoes, while the hoes themselves are arranged in either position, substantially as described.

2. The combination of a series of hinged or oscillating grain-tubes D, arranged to receive the grain from a single row of openings in the hopper with a corresponding series of drill-hoes E, constructed and arranged as described.

3. The arrangement of the sliding bar c and the supporting-rods a, in relation to the frame A of a grain-drill, substantially as described.

JOHN H. THOMAS.

Witnesses:
GEO. ARTHUR,
JAMES W. JARRETT.